(12) United States Patent
Winters (10) Patent No.: US 8,706,131 B2
(45) Date of Patent: Apr. 22, 2014

(54) DEVICE LOCATION PREDICTION FOR MOBILE SERVICE OPTIMIZATION

(75) Inventor: Jack H. Winters, Middletown, NJ (US)

(73) Assignee: Empire Technology Development LLC, Wilmington, DE (US)

( * ) Notice: Subject to any disclaimer, the term of this patent is extended or adjusted under 35 U.S.C. 154(b) by 340 days.

(21) Appl. No.: 12/487,054

(22) Filed: Jun. 18, 2009

(65) Prior Publication Data

US 2010/0323715 A1    Dec. 23, 2010

(51) Int. Cl.
*H04W 72/00*   (2009.01)
*H04W 24/00*   (2009.01)

(52) U.S. Cl.
USPC ............... 455/452.2; 455/456.1; 342/357.2; 340/988

(58) Field of Classification Search
None
See application file for complete search history.

(56) References Cited

U.S. PATENT DOCUMENTS

| | | | |
|---|---|---|---|
| 5,375,123 A * | 12/1994 | Andersson et al. | 370/333 |
| 6,292,661 B1 * | 9/2001 | Patronen et al. | 455/436 |
| 6,308,072 B1 * | 10/2001 | Labedz et al. | 455/448 |
| 2001/0025222 A1 * | 9/2001 | Bechtolsheim et al. | 701/209 |
| 2004/0017310 A1 * | 1/2004 | Vargas-Hurlston et al. | 342/357.1 |
| 2006/0211430 A1 * | 9/2006 | Persico | 455/456.1 |
| 2008/0248822 A1 * | 10/2008 | Jarvinen et al. | 455/509 |
| 2009/0061895 A1 * | 3/2009 | Vasa | 455/456.2 |
| 2009/0164115 A1 * | 6/2009 | Kosakowski et al. | 701/201 |
| 2009/0203394 A1 * | 8/2009 | Shaffer et al. | 455/525 |
| 2010/0069070 A1 * | 3/2010 | Shi et al. | 455/436 |

OTHER PUBLICATIONS

Wikipedia, Handoff, Oct. 21, 2009, 5 pgs.
Hwang, Jen-Kuang et al., Sinusoidal Modeling and Prediction of Fast Fading Processes, IEEE 1998, pp. 892-897.
Turin, William et al., Modeling Wireless Channel Fading, IEEE 2001, pp. 1740-1744.
Stacy, M., "Small GPS devices help prosecutors win convictions," Aug. 28, 2008, accessed at http://web.archive.org/web/20080912125902/http://apnews.excite.com/article/20080828/D92RGH4O0.html, pp. 3.

* cited by examiner

*Primary Examiner* — German J Viana Di Prisco
(74) *Attorney, Agent, or Firm* — Jensen & Puntigam, PS (57) ABSTRACT

Described technologies are generally related to predicting future mobile device locations and using the predictive information to optimize mobile communications service parameters. Mobile device locations may be predicted using real-time device location information, destination information, and location history. Predicted location information for a given device, and possibly other devices as well, may be used to adjust mobile communications service parameters such as handoffs, channel assignment, multipath fading response parameters, data rates, transmission modes, opportunistic scheduling parameters, location-based services, and location update rates.

21 Claims, 6 Drawing Sheets

DEVICE LOCATION PREDICTION FOR MOBILE SERVICE OPTIMIZATION

BACKGROUND

Mobile communications, by definition, provide communications services to devices that move through space. Mobile communications services must adapt to new device locations as the devices move. Effective adaptation is one aspect of providing quality mobile communications service.

Mobile communications services adapt to new device locations in a variety of ways such as switching communications channels and adjusting device, transmission, and network settings. A handoff is one example of adapting to new device locations. In mobile telecommunications, the term handoff refers to a process of transferring an ongoing call or data session from one transmissions channel to another. There are a variety of reasons why a handoff might be conducted, including for example, when a mobile communications device in a cellular network is moving away from an area covered by a first cell, and entering an area covered by a neighboring cell. In this scenario, the call or data session may be transferred to the neighboring cell in order to avoid call degradation or termination when the mobile device moves outside the range of the first cell.

One or more current signal quality parameters may be monitored to decide when a handoff should be made. Current signal quality parameters may include, for example, current received signal power, current received signal-to-noise ratio, current bit error rate (BER), current block error/erasure rate (BLER), current received quality of speech (RxQual), current distance between the mobile device and a base station, and other current signal quality parameters. In cellular communications, a mobile device and base stations of neighboring cells monitor each other's signals and the best target candidates are selected among the neighboring cells, based on current signal quality parameters. The handoff may be requested by the mobile device, by a base station associated with the first cell, or by a base station of a neighboring cell.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and made part of this disclosure.

While adapting to new device locations by reacting to one or more current measurements is workable, one problem that occurs is, by the time that a mobile device or other network component can gather any required information and make a service decision, such as when to make a handoff, which neighbor cell to use, which network and channel to use, which data rate to set for a mobile device, or how many spatially-multiplexed data streams to allow for a mobile device, the location of the mobile device may have changed already, especially if the mobile device is moving quickly. In addition, the interference environment may also have changed, even if the mobile device is stationary, since other mobile devices may be moving. This often renders mobile service decisions no longer optimum, and can lead to significant degradation in performance for some mobile devices. Indeed, current wireless systems often add a significant margin to the required performance threshold to accommodate this degradation. For example, hysteresis is added for handoffs, such that the received signal level from a currently used base station needs to be well below that of another base station before a handoff occurs.

The present disclosure generally relates to systems and methods for predicting future mobile device locations, and optimizing mobile communications service parameters based on the predictive information. Mobile device locations may be predicted for example using one or more of real-time device location information, previous device location information, commuter information, velocity information, or time-of-day information. Location predictions may provide a basis for additional predictions such as a predicted interference environment, predicted multipath fading environments, and predicted service availability. Predictions may be calculated by a network server, by a mobile device, or by a third party location prediction service. Predicted location information may be used to adjust one or more mobile communications service parameters, such as for example handoffs, channels, multipath fading response parameters, data rates, transmission modes, opportunistic scheduling parameters, location-based services, and location update rates.

Figure 1:
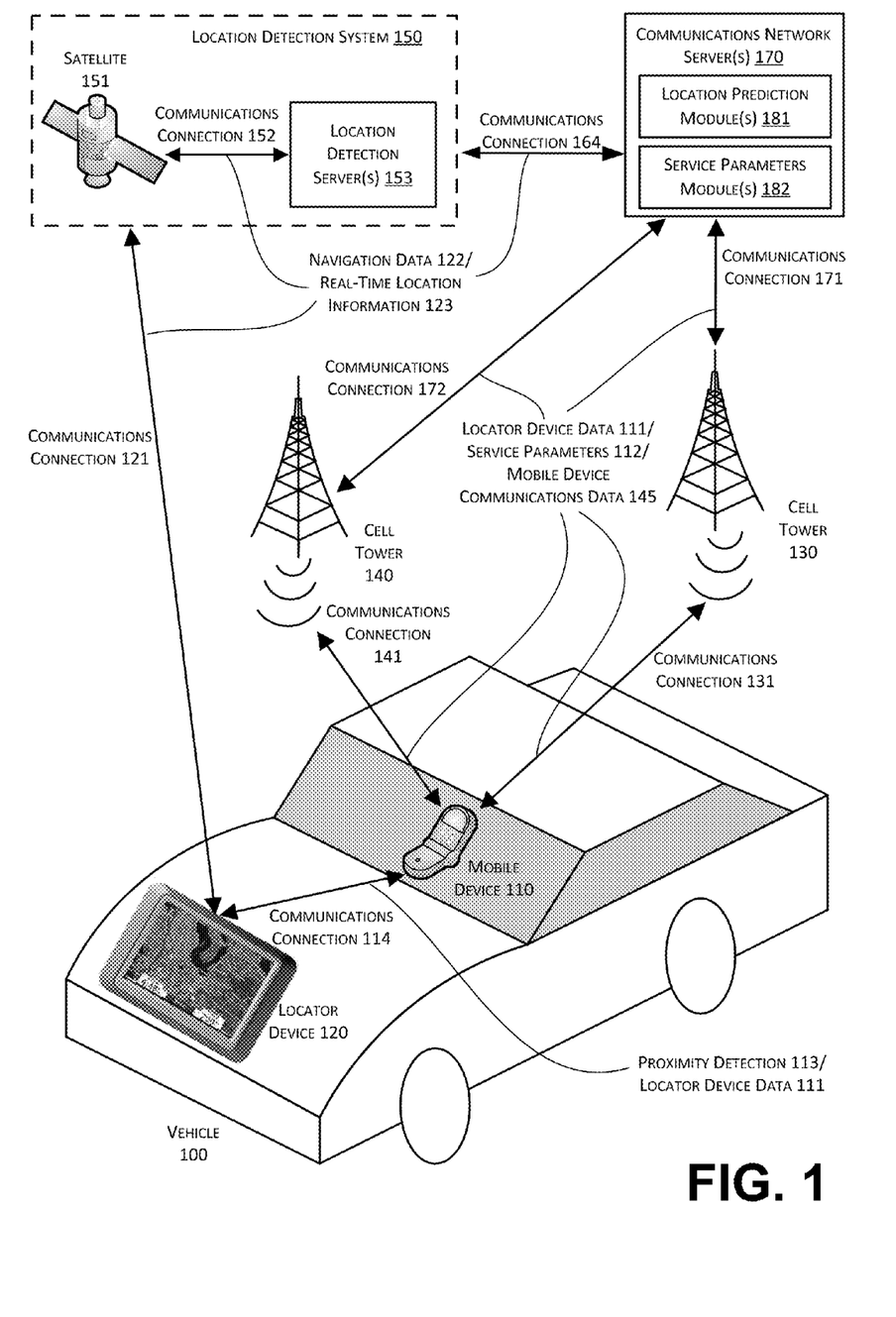
FIG. 1 is a diagram illustrating an example system that may be used to predict future mobile device locations in order to provide optimized mobile services.

FIG. 1 is a diagram illustrating an example system that may be used to predict future mobile device locations in order to provide optimized mobile services. FIG. 1 comprises a vehicle 100, a mobile device 110, a locator device 120, a location detection system 150 comprising satellite 151 and location detection server(s) 153, communications network server(s) 170 comprising location detection module(s) 181 and service parameters modules 182, and cell towers 130 and 140.

In FIG. 1, locator device 120 may be coupled to location detection system 150 via communications connection 121, over which navigation data 122 and/or real-time location information 123 may be transmitted. Inside location detection system 150, satellite 151 may be coupled with location detection server(s) 153 via communications connection 152, over which navigation data 122 and/or real-time location information 123 may be transmitted. Location detection system 150 may also be coupled with communications network server(s) 170 via communications connection 164, over which navigation data 122 and/or real-time location information 123 may be transmitted. Communications network server(s) 170 may be coupled with cell towers 130 and 140, via communications connections 171 and 172, respectively. Either of cell towers 130 and 140 may be coupled with mobile device 110 via communications connections 131 and 141, respectively. One or more of locator device data 111, service parameters 112, and mobile device communications data 145, may be transmitted over communications connections 171, 172, 131 and 141. Mobile device 110 may be coupled with locator device 120 via communications connection 114, over which proximity detection data 113 and/or various other data may be transmitted as discussed further below. Finally, locator device 120 and mobile device 110 are illustrated as disposed inside vehicle 100 in the illustrated embodiment.

In FIG. 1, locator device 120 may for example comprise a Global Positioning System (GPS) unit. Mobile device 110 may be configured to use proximity detection data 113 to detect that it is in range of locator device 120. Upon detection, mobile device 110 may optionally acquire locator device data 111 from the locator device 120, and may establish a location information link for communication of real-time mobile device 110 location information to communications network server(s) 170. This may be accomplished for example by providing locator device data 111 identifying the locator device 120 to communications network server(s) 170. Network server(s) 170 may be arranged to establish a link to location detection system 150, such as the GPS, over which network server(s) 170 may receive real-time location information 123. Network server(s) 170 may thereby be arranged to track the location of locator device 120, and correspondingly, the location of mobile device 110. Location prediction module(s) 181 may be arranged to use the real-time location information 123 to predict future locations of the mobile device 110. For example, it may be predicted that device 110 will pass from the range of cell tower 130 into the range of cell tower 140, at a particular optimal time for handoff. Prediction data may be used by service parameters modules 182 to set service parameters for the mobile device 110 accordingly. Meanwhile, locator device 120 may be arranged to communicate real-time location information 123 to location detection system 150, or location information may otherwise be obtained by location detection system 150, so that detection system 150 may continue to have real-time location information 123. If mobile device 110 ceases to detect proximity detection data 113, it may inform the network server(s) 170, which may be configured to stop monitoring real-time location information 123, and may be configured to optionally switch to servicing mobile device 110 based on current location instead of predicted location. Mobile device communications data 145 may comprise regular device communications such as, for example, voice telephone calls and data transmissions, which may be handled by the communications network.

In the system depicted in FIG. 1, locator device 120 may comprise for example a stand-alone GPS unit or other stand-alone navigational device, a vehicle-based GPS unit or other vehicle-based navigational device, or a GPS device or navigational device integrated into mobile device 110. Locator device 120 may comprise a navigation device in which the user may enter destination data, such as in many vehicle navigation systems where such data may be provided as navigation data 122 to location detection system 150 and then to communications network server(s) 170, or to communications network server(s) 170 via mobile device 110. Navigation data 122 may be usefully leveraged by location prediction module(s) 181, because it may comprise explicit data about predicted locations, which may in some cases be more accurate than predicting locations based on historical movements or other metrics. Some embodiments may dispense with the locator device 120, and instead rely upon so-called cell phone location technology which triangulates the position of a mobile device based upon signals transmitted between device 110 and cell towers such as 130 and 140. Mobile device 110 may comprise for example a cellular telephone, Personal Digital Assistant (PDA), or a laptop computer.

In embodiments where mobile device 110 is separate from locator device 120, network server(s) 170 may be configured to determine that the two devices 110 and 120 are proximate to one another. In some embodiments this may be accomplished by receiving locator data 111 as described above. The mobile device 110 may have the capacity (for example, via Bluetooth, a mobile device dock to an automobile navigation system, or otherwise) to detect when mobile device 110 is in the vicinity of the locator device 120. Mobile device 110 may be configured to notify the server(s) 170 that mobile device 110 is in the vicinity of the locator device 120, and server(s) 170 may be configured to obtain information from the location detection system 150 for as long as mobile device 110 is in the vicinity of the locator device 120. In some embodiments, detecting that mobile device 110 is in the vicinity of the locator device 120 may be accomplished at the server(s) 170 by matching real-time location information 123 to triangulated location information associated with the mobile device 110.

In embodiments where mobile device 110 and locator device 120 may be integrated into a single unit, as in the case of many of today's smart phones which comprise integrated onboard GPS units, real-time device location information 123 may be obtained by the network server 170 directly from the mobile device 110. Mobile device 110 may be configured to determine a physical location from an integrated onboard GPS unit, and mobile device 110 may periodically transmit the determined physical location to the server(s) 170. Mobile device 110 may also be configured to determine its location using cell phone location triangulation techniques as set forth above, or for example via a user interface that allows a user to input location information.

Location prediction module(s) 181 may be configured to predict future mobile device 110 locations using a variety of techniques. For example, device locations may be predicted based on one or more of real-time location information, previous location information, commuter information, velocity information, or time-of-day information. Location prediction module(s) 181 may in some embodiments be arranged to collect data such as historical device location data, or other user data such as user home and/or work addresses, and may be arranged to determine movement patterns based on the collected data. The determined movement patterns may be used by the location prediction module 181 to generate predictive data about a device's likely future location.

Predicting device locations based on real-time location information may involve, for example, applying known movement patterns to a present device location. For example, it may be that whenever a device is found to be on a certain southbound onramp to a particular highway, the device is likely to be at a location 10 miles south of the onramp in approximately 10 minutes.

Predicting device locations based on previous location information may involve, for example, applying known movement patterns to a present device movement pattern. For example, it may be that whenever a device is found to have been first in a first position on a particular highway, and five minutes later in a second position on the highway, the device may be accurately predicted to be in a third position along the same highway, for example at a location 10 miles south of the second position, in approximately 10 minutes.

Predicting device locations based on commuter information may involve, for example, applying known commute patterns to a present device location. For example, it may be known that a particular device commutes from point A to point B every weekday afternoon. Whenever a device is found to have left point A, it may be predicted that the device will be at point B in roughly 20 minutes, and may furthermore follow a predictable route to point B.

Predicting device locations based on velocity information may involve, for example, calculating a velocity comprising speed and direction of a device at a particular time. The velocity information may be used to predict the device locations along a same trajectory, or alternatively, to apply known movement patterns to the velocity information.

Predicting device locations based on time-of-day information may involve, for example, applying known movement patterns to a present device location based on time of day. For example, a commute-based prediction as discussed above may use time-of-day information. Also, it may be known for example that if a particular device moves away from point A at noon, the device is likely to proceed to a first location, while if the particular device moves away from point A at 5 o'clock, the device will most likely proceed to a second location.

Predicted location information may be used to adjust a variety of cellular network parameters, such as for example handoffs, channels, multipath fading response parameters, data rate, transmission mode, opportunistic scheduling, location-based service, or location update rate. Predicted movement information may be used to determine the update rate for network parameters, including when a wireless user sends update information and when the network recalculates the network parameters.

While the location prediction module 181 may be illustrated on the network server 170 in FIG. 1, the location prediction module 181 may in some embodiments be located on the mobile device 110, or on another network component such as a base station at a cell tower 140. When mobile device 110 is equipped with an onboard GPS or other locator device apparatus, the mobile device 110 may be well suited for aggregating device movement data and making predictions about future device movements. Moreover, in some embodiments information about details of historical device movements may be considered sensitive, private information which may be better suited for being retained on a personal device, rather than communicated to a network server. In such embodiments, prediction data generated by location prediction module(s) 181 implemented on device 110 may be communicated from device 110 to server(s) 170 to be used in determining service parameters, as described below. Alternatively, certain service parameters such as handoffs and handoff timing may be set by device 110 or a network component such as a base station at a cell tower 140. Also, in some embodiments, device location data and/or predictive information may be obtained by a third party data supplier. The third party supplier may then provide prediction data to a network component such as the network server(s) 170, for example by exposing a networked database Application Programming Interface (API) to the network server(s) 170, for their use in retrieving device location predictions on an as-needed basis.

Location prediction information produced by location prediction module(s) 181 may be used by service parameters module(s) 182 to set service parameters at least in part based on predicted device 110 locations. Mobile communications service parameters that may be beneficially adjusted based on location prediction information include for example handoffs parameters (including which component to hand off to as well as time of handoff), channels, multipath fading response parameters, data rates, transmission modes, opportunistic scheduling parameters, location-based services, and location update rates. These parameters are described in the discussion of FIG. 3, operation 305, found below.

Network server 170 also may be arranged to store a variety of information to optimize the network's performance. For example, in order to integrate multiple wireless networks and provide content distribution to wireless devices, the network server 170 may be arranged to store data pertaining to wireless services (Wi-Fi, WiMAX, cellular, etc.) that are available at a given location, as well as the costs and capabilities of each service. For location-based services, the network server 170 may be arranged to store a mobile device current location and the services available at or near that location. For spectrum sensing for cognitive radio devices, the network server 170 may be arranged to estimate the interference environment at a given location.

Figure 2:
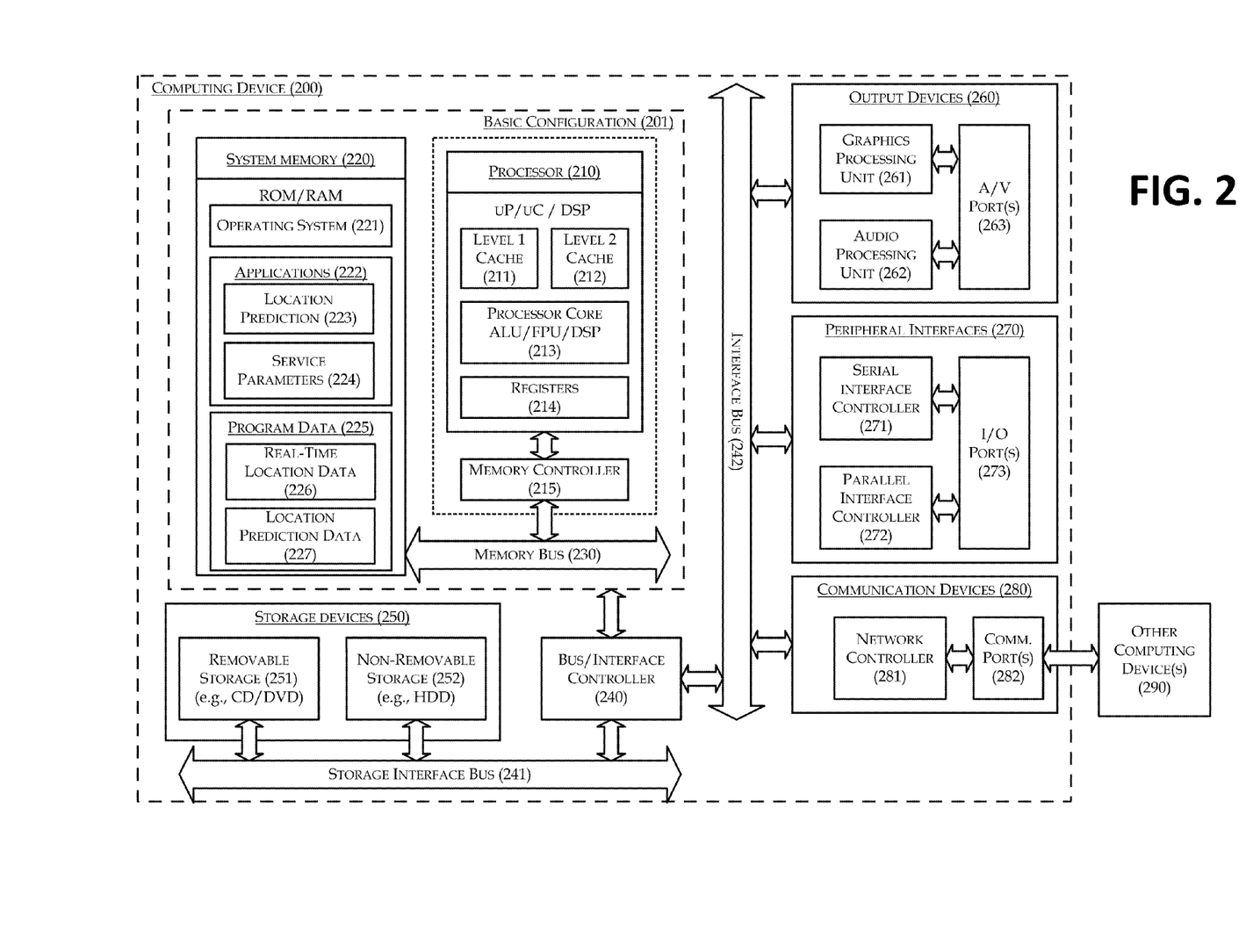
FIG. 2 is a block diagram illustrating a computing device as one example of a network server that may serve as network server 170 in FIG. 1.

FIG. 2 is a block diagram illustrating a computing device 200 as one example of a network server that may serve as network server 170 in FIG. 1 in accordance with the present disclosure. In a very basic configuration 201, computing device 200 typically includes one or more processors 210 and system memory 220. A memory bus 230 may be used for communicating between the processor 210 and the system memory 220.

Depending on the desired configuration, processor 210 may be of any type including but not limited to a microprocessor (μP), a microcontroller (μC), a digital signal processor (DSP), or any combination thereof. Processor 210 may include one or more levels of caching, such as a level one cache 211 and a level two cache 212, a processor core 213, and registers 214. The processor core 213 may include an arithmetic logic unit (ALU), a floating point unit (FPU), a digital signal processing core (DSP Core), or any combination thereof. A memory controller 215 may also be used with the processor 210, or in some implementations the memory controller 215 may be an internal part of the processor 210.

Depending on the desired configuration, the system memory 220 may be of any type including but not limited to volatile memory (such as RAM), non-volatile memory (such as ROM, flash memory, etc.), or any combination thereof. System memory 220 typically includes an operating system 221, one or more applications 222, and program data 225.

Applications 223-224 may include, for example, location prediction module(s) 223 and service parameters module(s) 224. Program data 226-227 may include real-time location data 226 and predictive future location data 227 that may be used by applications 223-224, as well as any data needed for making location predictions as may be stored in data 227, and any data needed for adjusting service parameters based on the predictive future location data 227.

Real-time location data 226 may be acquired in several ways. In some embodiments, the data may be acquired from a location detection system such as GPS. GPS systems may also provide additional information in some embodiments, such as velocity information. Also, a GPS unit or other locator device may transmit information about its current location, allowing the information to be stored on a network server together with identifying information that allows it to be matched to other current or historic data about the same device user. For multiple users who share a single device, the network server application may have the capacity to keep track of each user's data separately. In other embodiments, the user's location may be determined via the user's mobile device, for example through measuring the mobile signal based on its proximity to nearby cell towers. In other embodiments, the user may manually specify his or her current location through a user interface on the user's mobile device.

Similarly, location prediction data 227 may be generated in several ways. In some embodiments, the network server may include a stored database of user- or device-specific information including historical and current location data. The data may be analyzed to generate the user's most frequently traveled routes, which may then be matched to real-time location data to predict future movement. In other embodiments, the server may access a database of commercially obtained third-party data, which may be matched to real-time location data to predict future movement. In other embodiments, location prediction data 227 may be received from a device equipped with a location prediction module, or a user may manually specify his or her intended destination through a user interface on the user's mobile device, such as by entering destination data in a navigation or directions lookup system. Note that navigational units also estimate the duration of a trip, and can therefore predict not just where a user will be but when they will be there.

The network server may also use program data 225 to calculate the user's direction of travel and velocity. It may then use the velocity information to determine the optimal rate at which it should update the stored real-time location data 226 and the predicted future location data 227. For example, for a vehicle traveling at 10 miles per hour, the network server may need to update its data every few seconds, while for a vehicle traveling at 100 miles per hour, the network server may need to update its data more frequently.

Computing device 200 may have additional features or functionality, and additional interfaces to facilitate communications between the basic configuration 201 and any required devices and interfaces. For example, a bus/interface controller 240 may be used to facilitate communications between the basic configuration 201 and one or more data storage devices 250 via a storage interface bus 241. The data storage devices 250 may be removable storage devices 251, non-removable storage devices 252, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable and non-removable media implemented in any method or technology for storage of information, such as computer readable instructions, data structures, program modules, or other data.

System memory 220, removable storage 251, and non-removable storage 252 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that may be used to store the desired information and that may be accessed by computing device 200. Any such computer storage media may be part of device 200.

Computing device 200 may also include an interface bus 242 for facilitating communication from various interface devices (e.g., output interfaces, peripheral interfaces, and communication interfaces) to the basic configuration 201 via the bus/interface controller 240. Example output devices 260 include a graphics processing unit 261 and an audio processing unit 262, which may be configured to communicate to various external devices such as a display or speakers via one or more A/V ports 263. Example peripheral interfaces 270 include a serial interface controller 271 or a parallel interface controller 272, which may be configured to communicate through either wired or wireless connections with external devices such as input devices (e.g., keyboard, mouse, pen, voice input device, touch input device, etc.) or other peripheral devices (e.g., printer, scanner, etc.) via one or more I/O ports 273. Other conventional I/O devices may be connected as well such as a mouse, keyboard, and so forth. An example communications device 280 includes a network controller 281, which may be arranged to facilitate communications with one or more other computing devices 290 over a network communication via one or more communication ports 282.

The communications connection is one example of a communication media. Communication media may typically be embodied by computer readable instructions, data structures, program modules, or other data in a modulated data signal, such as a carrier wave or other transport mechanism, and include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR), and other wireless media.

Computing device 200 may be implemented as a portion of a small-form factor portable (or mobile) electronic device such as a cell phone, a personal data assistant (PDA), a personal media player device, a wireless web-watch device, a personal headset device, an application-specific device, or a hybrid device that include any of the above functions. Computing device 200 may also be implemented as a personal computer including both laptop computer and non-laptop computer configurations.

Figure 3:
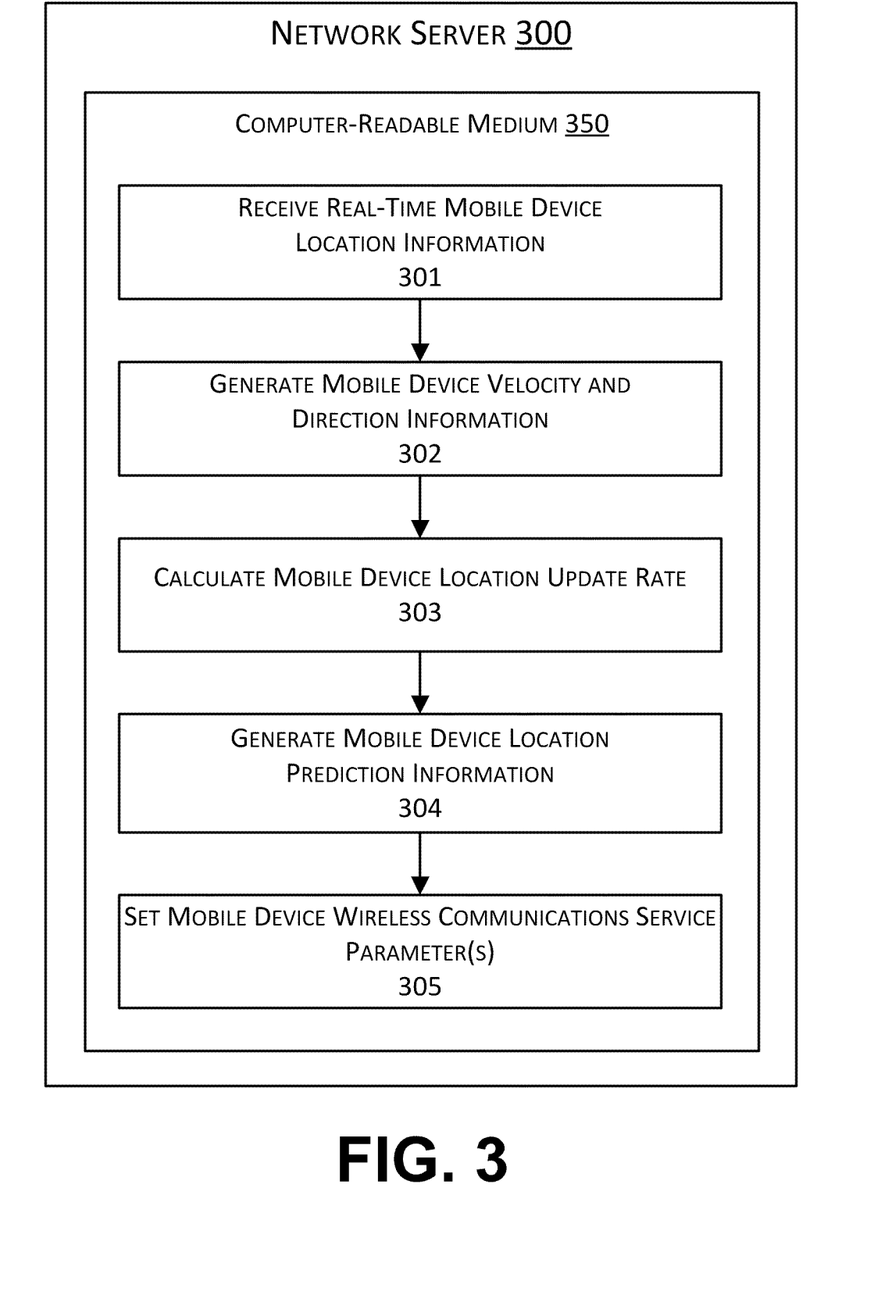
FIG. 3 is a flow diagram illustrating an example method that may be performed by a network server such as network server 170 in FIG. 1.

FIG. 3 is a flow diagram illustrating an example method that may be performed by a network server such as network server 170 in FIG. 1 in accordance with the present disclosure. The example flow diagram may include one or more operations/modules as illustrated by blocks 301-305, which represent operations as may be performed in a method, functional module in a network server 300, and/or instructions as may be recorded on a computer readable medium 350. The illustrated operations/modules 301-305 may be arranged to provide functional operations including one or more of "Receive Real-Time Mobile Device Location Information" at operation 301, "Generate Mobile Device Velocity and Direction Information" at operation 302, "Calculate Mobile Device Location Update Rate" at operation 303, "Generate Mobile Device Location Prediction Information" at operation 304, and/or "Set Mobile Device Wireless Communications Service Parameter(s)" at operation 305.

In FIG. 3, operations 301-305 are illustrated as being performed sequentially, with operation 301 first and operation 305 last. It will be appreciated however that these operations may be re-ordered as convenient to suit particular embodiments, and that these operations or portions thereof may be performed concurrently in some embodiments. It will also be appreciated that in some examples various operations may be eliminated and/or combined with other operations.

FIG. 3 illustrates an example method by which network server 300 may receive real-time location information relating to a mobile device, determine location prediction information, and, using the location prediction information, set one or more parameters for mobile device communications.

In a "Receive Real-Time Mobile Device Location Information" operation 301, the network server 300 may be arranged to receive real-time mobile device location information in one of several ways, and store the information on a computer-readable medium 350. As discussed above, the network server 300 may be arranged to receive real-time location information for example from a location detection system such as a GPS unit, or directly from a device equipped with GPS or other navigational device that may be equipped to determine a physical location and transmit this location information to the server 300. The network server 300 may also be arranged to receive real-time information for example from a mobile device that may include radio location functionality, or may include a user interface that allows a user to input current location information.

In embodiments in which network server 300 is arranged to receive real-time location information from a location detection system such as GPS, operation 301 may comprise for example receiving GPS unit identification information, connecting with a GPS information provider, supplying the GPS information provider with the GPS unit identification information, and receiving from the GPS information provider location information associated with the identified GPS unit. In some examples, operation 301 may alternatively comprise receiving location information for one or more GPS units associated with a mobile device, and receiving or otherwise determining device location based on triangulated cell phone location. When the triangulated cell phone location matches a location of one of the GPS units, operation 301 may begin using GPS information corresponding to the unit for the mobile device location. When the triangulated cell phone location ceases to match the location of the one of the GPS units, as detected for example by a periodic location match update, operation 301 may stop using GPS information corresponding to the unit for the mobile device location.

In some embodiments, the network server may be arranged to identify a user associated with a mobile device through for example an identifying code transmitted by the navigational device or mobile device or a database lookup of the associated user, and may be arranged to store the real-time location information together with other recent or historical data relating to the same user. User movement patterns may thus be applied to a variety of different mobile devices the user may carry, and these movement patterns may be used to generate location predictions and set corresponding service parameters.

In a "Generate Mobile Device Velocity and Direction Information" operation 302, the network server 300 may be arranged to determine the direction in which the device is traveling from the real-time location information received in step 302, and may calculate the device's velocity.

In a "Calculate Mobile Device Location Update Rate" operation 303, once the network server 300 has calculated the device's velocity, the network server may be arranged to calculate the optimal rate to update data about the device's actual and predicted location. As noted above, devices traveling at lower rates of speed may generally require less frequent update rates, while devices traveling more quickly may require more frequent update rates in order to continue to optimize network performance based on location prediction information.

In a "Generate Mobile Device Location Prediction Information" operation 304, the network server 300 may be arranged to use one or more means of predicting the device's likely future location at a given time based on the device's current real-time location and one or more additional pieces of data, such as for example previous location(s), commuter information, velocity information, and/or time of day information. In some embodiments, the network server 300 may be configured to query a database of stored user information to determine past patterns of movement and make a prediction based on those patterns. For example, the database may contain information that a user typically travels between a work location and a home location on a given route within a given timeframe on most weekdays. Given real-time location data that matches the beginning of the route and the timeframe, the server may be arranged to predict that the mobile device will continue to travel along the route and may be arranged to determine when the device is likely to arrive at various points along the route. The server 300 may be configured to update its real-time location data at a determined rate as set forth above, in order to confirm whether location predictions have been accurate so far and whether the predicted location data needs to be recalculated.

In other embodiments, the user may provide information through for example a user interface on the user's mobile device, indicating the user's intended location. The network server 300 may be arranged to calculate the vehicle's velocity and the route between the user's current real-time location and the user's intended destination, and may predict when the user is likely to arrive at various points along the route.

In other embodiments, the network server 300 may include a database or other form of third-party information, such as a commercial database of compiled information that may be used to predict a device's likely future location given its current location and direction of travel. The information in the database need not be specific to a device or user, but may offer predictions based on aggregated data from a number of devices/users. For example, with prediction data showing that a large percentage of users travel a particular route at a particular time to a certain restaurant, the server may be arranged to predict that a particular device/user on that route at that time is going to that restaurant. As noted above, the server may be configured to update its real-time location data at a determined rate in order to confirm whether its predictions have been accurate, and whether the predicted location data needs to be recalculated. The update rate may vary depending on whether the prediction is based on historic user-specific data or multi-user data.

In a "Set Mobile Device Wireless Communications Service Parameter(s)" operation 305, the network server 300 may be arranged to attempt to optimize network performance by setting one or more parameters for communicating with the mobile device based at least in part on the prediction information.

The prediction information may include, depending on the embodiment, location prediction information as well as additional prediction information that is based on or related to the location prediction information, such as a predicted interference environment, predicted multipath fading environments, and predicted service availability. In some embodiments, the prediction information may furthermore include prediction information relating to a plurality of mobile devices. The network may use the predicted location information relating to a plurality of devices, in combination with the capabilities of one or more of these devices, such as the ability to operate in certain modes (WiFi, WiMAX, cellular) with different levels of interference protection (e.g., using adaptive antennas), to set the network/device parameters.

Mobile device wireless communications parameters may include, for example, one or more of a handoff parameter, a transmission channel parameter, a multipath fading response parameter, a transmission mode parameter, a data rate parameter, an opportunistic scheduling parameter, a location-based service parameter, and/or a location update rate parameter.

A handoff may refer to the continuous provision of mobile service while a connection is in progress, which may be accomplished by changing the channel of the connection as the mobile device travels from one connection point to another. Handoff is a component of providing optimal network service. Badly designed handoffs tend to generate very heavy signaling traffic, which dramatically lowers the quality of service. To be successful, a handoff should be performed quickly, infrequently, and without the user noticing it. Using predicted location information may allow the network server 300 to optimize handoffs by proactively determining when a user is likely to require a handoff, and which cell to handoff to. These parameters may be sent to a mobile device, or to a base station associated with the handoff. By anticipating when a user is likely to be within range of certain cell towers, the server may be able to determine the optimal handoff parameters to minimize a loss of quality of service. Thus, the margin used with hysteresis for handoffs can be reduced or eliminated.

A transmission channel parameter may refer to the selection of a particular channel for wireless communication. Channels may be owned by various entities, such as different wireless communications service providers, and may have varying amounts of interference. Too many wireless access points on the same channel or on a neighboring channel may cause significant interference, particularly in high-density areas. In addition, certain channels may be shared by numerous non-wireless devices that may cause interference, such as microwave ovens, security cameras, Bluetooth devices, amateur radios, video senders, cordless phones, and baby monitors. Using predicted location information may allow the network server 300 to determine the optimal transmission channel by proactively scanning available channels to identify one or more channels with the least amount of interference, rather than waiting for the user to experience interference and seek a new channel. Also, past information on, or most recent measurement of, interference at a location by the mobile device, or other mobile devices, can be used to estimate the interference that will occur at a given time in the future and permit the mobile device parameters to be changed at the appropriate time to act proactively, rather than reactively.

A multipath fading response parameter may include any device communications parameter that is set in response to a multipath fading environment in which the device is located. Short term prediction of the multipath fading environments is explored for example in Jeng-Kuang Hwang and J. H. Winters, "Sinusoidal modeling and prediction of fast fading processes," Proceedings of the IEEE Global Telecommunications Conference, 1998, pages 892-897, vol. 2.

A transmission mode may refers to the method of communication between the network server 300 and the mobile device. A given transmission on a communications channel may be characterized by the direction of the exchanges, the number of pieces of information sent simultaneously, and synchronization between the transmitter and receiver. In a simplex connection, the data flows from the transmitter to the receiver. In a half-duplex or alternating connection, the data flows in one direction or the other, but not both at the same time, making it possible to have bidirectional communications using the full bandwidth capacity of the line. In a full-duplex connection, the data flows in both directions simultaneously, causing the bandwidth to be divided in two for each direction of data transmission when the same transmission medium and transmission speed is used for both directions of transmission. Examples of transmission modes may include a cellular phone call routed through a cell tower, or a data transmission routed through a Wi-Fi hotspot. Using predicted location information may allow the network server 300 to determine the optimal transmission mode based on available services at the user's anticipated location. For example, the server may be configured to determine that there is an available Wi-Fi hotspot at the predicted location and may seamlessly transfer the user to that hotspot at the earliest possible moment, rather than waiting for the user to come within range and then scanning to find an available connection.

A data rate parameter may refer to the optimal rate (or approximately optimal rate) at which data may be sent from the network server 300 to the mobile device. In general, the greater the bandwidth of a given path, the higher the data transfer rate may be. Thus, the data rate may be limited by the bandwidth of the transmission mode or the type or quality of connection. Using predicted location information may allow the network server 300 to determine the maximum data rate at any given location along the user's predicted route and modulate the transmission of data based on the optimal rate. The server may also be arranged to set an opportunistic scheduling parameter based on the data rate determination.

Opportunistic scheduling may refer to scheduling data transmissions based on favorable channel conditions to achieve higher network performance. By predicting a device's available communication speeds, opportunistic scheduling may allow data transmission to be scheduled during relatively good conditions, thereby optimizing (or approximately optimizing) transmission speed and quality. Using predicted location information may allow the network server 300 to opportunistically schedule data transmissions for the optimal point (or approximately optimal point) along the user's predicted route. For example, if the server predicts that the user will be in the vicinity of a WLAN hotspot with maximum data rate, the server may delay the data transmission until the user is within that range, rather than transmitting the data less efficiently at a less optimal point along the route.

Location-based services may refer to information and entertainment services that may be accessed by mobile devices based on the geographical position of the mobile device. Examples of location-based services may include providing information about the nearest business or service, such as a restaurant or bank machine; providing turn-by-turn navigation to any address; locating people on a map displayed on the mobile device; receiving alerts, such as warning of a traffic jam; or providing location-based mobile advertising. Using predicted location information may allow the network server 300 to offer a greater range of location-based services, allowing users to access information relevant to the user's future locations as well as the user's current location. When tied to mobile device location patterns and destinations, gas levels, predicted meal times, etc., the network can predict what services will be needed and when, rather than waiting until a user determines that they should have stopped for services before the congestion occurred, for example.

Location update rate may refer to the frequency with which the server may request updated real-time location information from the mobile device. As noted above, the requested update rate may be determined by the vehicle's velocity, with faster travel speeds requiring more frequent updates. Because each location update may require computational power and may reduce the data rate available for content transmission, the network server 300 may be arranged to calculate the optimal times to request location updates based on for example the user's predicted proximity to a high-bandwidth network.

Figure 4:
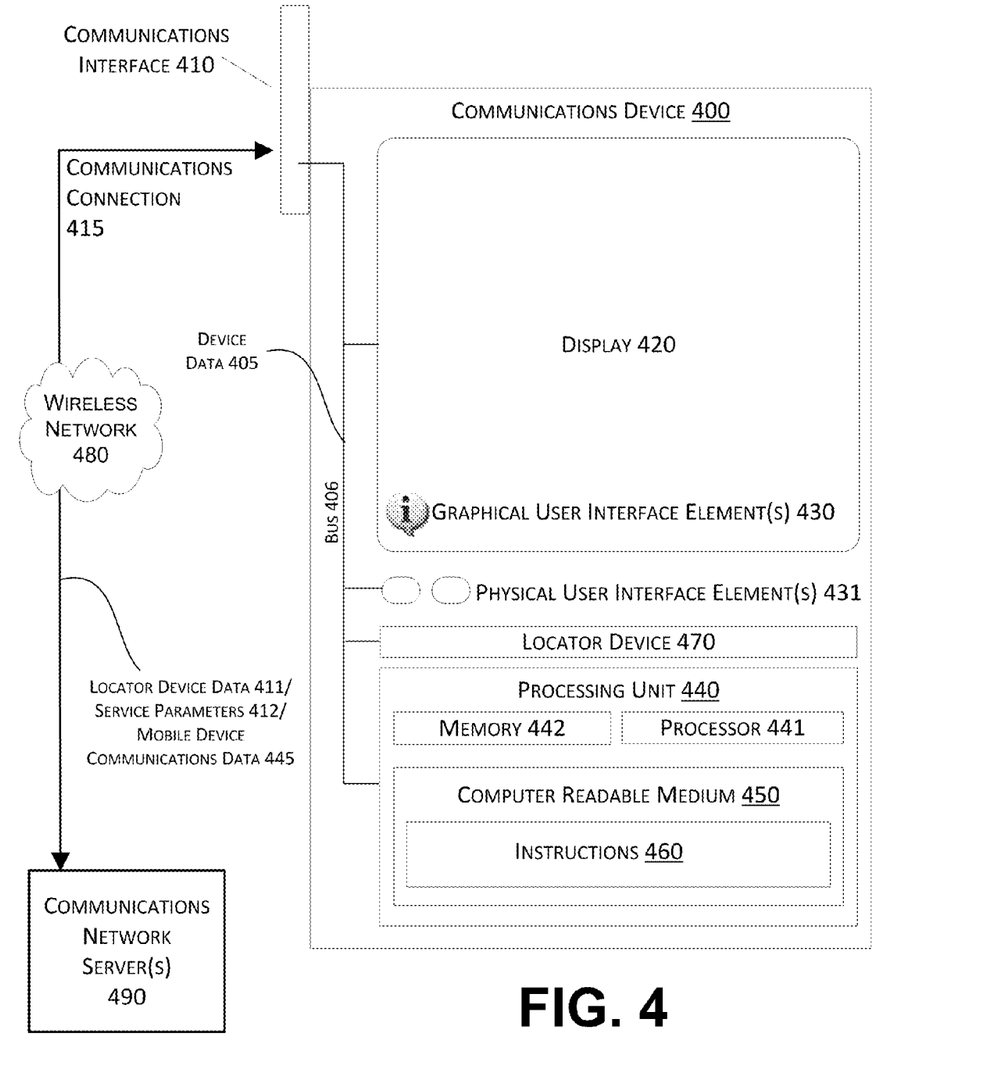
FIG. 4 is a diagram illustrating an example communications device such as device 110 in FIG. 1.

FIG. 4 is a diagram illustrating an example communications device 400 such as device 110 in FIG. 1 in accordance with the present disclosure. Communications device 400 may comprise a communications interface 410, a display 420, graphical user interface element(s) 430, physical user interface element(s) 431, a locator device 470, and a processing unit 440. The processing unit 440 may comprise a processor 441, memory 442, and a computer readable medium 450. The computer readable medium 450 may include instructions 460.

In FIG. 4, communications device 400 may be coupled with communications network server(s) 490 via communications connection 415, over which locator device data 411/service parameters 412/mobile device communications data 445 may be transmitted by way of the wireless network 480. In addition, the communications device's communication interface 410, display 420, physical user interface elements 431, locator device 470, and computer-readable medium 450 may be operatively coupled together via bus 406, over which device data 405 may be transmitted.

Figure 5:
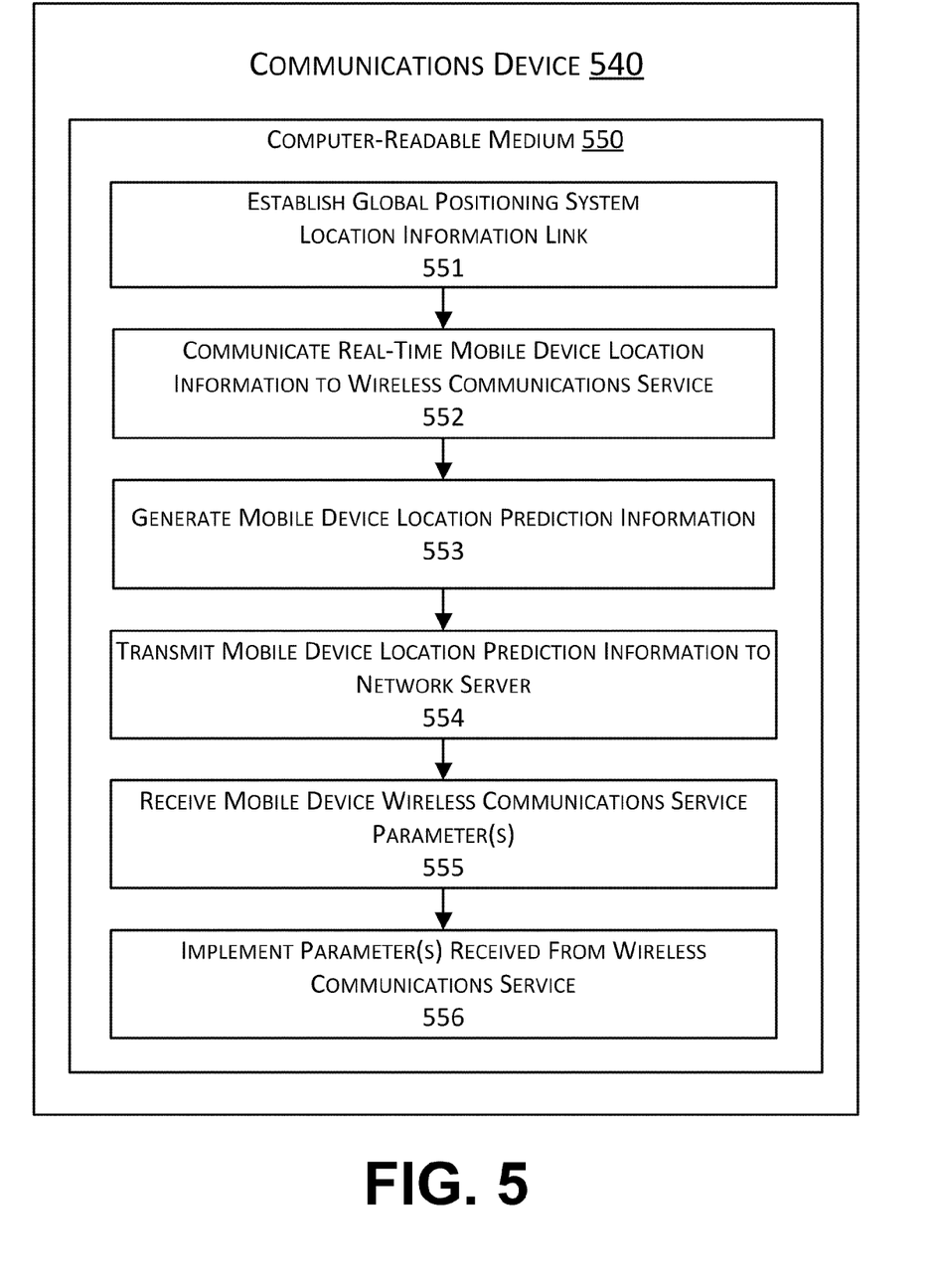
FIG. 5 is a flow diagram illustrating an example method that may be performed by a communications device such as device 110 in FIG. 1.

Instructions 460, which are further detailed in FIG. 5, may provide functional modules implemented by hardware and/or software in a device processing unit 440, as well as instructions that may be stored on a computer readable medium 450, and corresponding operations of a method as may be carried out by a device processing unit 440.

In some embodiments, communications device 400 may comprise a mobile communications device such as a cellular telephone, laptop computer, or some other mobile device. Device 400 may contain many of the same elements as the computing device shown in FIG. 2. The device 400 may be equipped with Bluetooth or similar functionality to allow it to communicate, via communications interface 410 or otherwise, with other nearby devices, such as for example a GPS device in a vehicle as illustrated in FIG. 1. The display 420 may be adapted to convey messages to the user via graphical user interface elements 430 (e.g., a data entry field or selectable icon), such as a message received from the network server via the communications interface 410. The display 420 also may be adapted to receive input from the user, such as manual entry of the user's current or intended location via physical user interface elements 431. This user information may be stored in the processing unit 440 and shared with the network server via the communications interface 410.

Device 400 may, in some embodiments, include a locator device 470. The locator device 470 may comprise a GPS unit or other radio location service technologies that are adapted to communicate location information to the processing unit 440, or to other devices. The locator device 470 may be configured, for example, to automatically update and/or transmit location information whenever the locator device 470 travels, or at fixed time intervals, or when the locator device 470 moves beyond a certain distance from an initial starting location.

The memory 442 may be configured to store device location history and other user information, for example historical information about a user's travel routes. The stored information may be used to generate location prediction information and set desired service parameters. Device location data, location predictions, and/or desired service parameters may be communicated as device data 405 to communication interface 410, and may be shared with a network server via the communications interface 410. The network server may also be arranged to generate location prediction information and set service parameters based thereon. In embodiments where device 400 includes prediction modules as part of instructions 460, device 400 may be arranged to retain historical information and provide location prediction information to a network server.

The processing unit 440, which may be adapted to execute a sequence of stored instructions 460, may be configured to perform one or more functions, as described in FIG. 5.

FIG. 5 is a flow diagram illustrating an example method that may be performed by a communications device such as device 110 in FIG. 1 in accordance with the present disclosure. The example method may include one or more of operations/modules 551-556. The illustrated operations/modules 551-556 may be arranged to provide functional operations including "Establish Global Positioning System Location Information Link" at operation 551, "Communicate Real-Time Mobile Device Location Information to Wireless Communications Service" at operation 552, "Generate Mobile Device Location Prediction Information" at operation 553, "Transmit Mobile Device Location Prediction Information to Network Server" at operation 554, "Receive Mobile Device Wireless Communications Service Parameter(s)" at operation 555, and "Implement Parameter(s) Received From Wireless Communications Service" at operation 556.

In FIG. 5, operations 551-556 are illustrated as being performed sequentially, with operation 551 first and operation 556 last. It will be appreciated however that these operations may be re-ordered as convenient to suit particular embodiments, and that these operations or portions thereof may be performed concurrently in some embodiments. It will also be appreciated that in some examples various operations may be eliminated and/or combined with other operations.

FIG. 5 discloses functional modules that may be implemented by hardware and/or software in a device processing unit such as the processing unit 440 in FIG. 4, as well as instructions that may be stored on a computer readable medium, and operations of a method as may be carried out by a device processing unit. FIG. 5 will be described herein as a method with the understanding that the disclosure also contemplates hardware and software implementations designed to carry out such a method.

FIG. 5 illustrates an example method as may be employed by a device 540 configured for interacting with a network that sets parameters based on location prediction, and for otherwise handling and/or generating location prediction data. Device 540 can be arranged to establish a link through which real-time location data may be transmitted to a network server. The device 540 may be configured to calculate or generate a predicted future location and transmit the location prediction information to the server. The server may be arranged to establish and communicate to the device, or to other network components, one or more parameters to optimize network performance, causing the device and such other network components to implement the established parameters.

In an "Establish Global Positioning System Location Information Link" operation 551, the mobile device may be arranged to use various methods to identify and transmit location data, such as GPS data, to the network server. For example, in some embodiments the mobile device may have an integrated GPS or other locator device that is arranged to generate data that may be communicated by the mobile device to the server. In other embodiments the mobile device may be in proximity to a GPS unit or other locator device and may use a wired or wireless connection, such as Bluetooth, or similar wireless technology to connect to and exchange information with the locator device. A device may be configured such that a user may enter locator device identification information via user interface provided by the mobile device. Locator device information may be communicated to a network server. The network server may be arranged to establish an independent link to a location detection system such as a GPS unit, whereby it may acquire real time device location information. Alternatively, location information may be relayed from a locator device to a mobile device, and subsequently to a network server. In some embodiments, a locator device such as a GPS unit or other navigation device may be configured, via information supplied from a mobile device, to directly transmit information to the network server.

In a "Communicate Real-Time Mobile Device Location Information to Wireless Communications Service" operation 552, the mobile device or the locator device may be arranged to communicate (e.g., transmit) real-time location information to the network server. The frequency of such transmissions may be adjusted via a parameter set by the network server, or by a setting in the device. As discussed above, the device may need to transmit updates more frequently as the vehicle's velocity increases. At the time of transmission, the device may simultaneously communicate identifying information that may allow the server to pair the transmitted information with prior user information stored on the server. Alternatively, the device may be arranged to communicate prior stored user information together with the real-time location information, or may be arranged to allow the server to access such stored information on the device.

In a "Generate Mobile Device Location Prediction Information" operation 553, the mobile device may be configured to use current and stored user location information to generate the user's predicted future location. In some embodiments the device may be adapted to use information stored on the device itself, while in other embodiments the device may be adapted to access information stored on the network server. The device may also be arranged to use third-party information, such as a commercially available database, to generate a predicted location.

In a "Transmit Mobile Device Location Prediction Information to Network Server" operation 554, the device may be arranged to transmit the predicted user location to the network server at time intervals specified by the server or by a setting in the device. The device may be instructed to transmit updated prediction information when the user's real-time location deviates from the predicted route.

In a "Receive Mobile Device Wireless Communications Service Parameter(s)" operation 555, the mobile device may be arranged to receive one or more parameters from the network server as discussed above, such as for example a handoff parameter, a transmission channel parameter, a transmission mode parameter, a data rate parameter, an opportunistic scheduling parameter, a location-based service parameter, and/or a location update rate parameter.

In an "Implement Parameter(s) Received From Wireless Communications Service" operation 556, the mobile device may be adapted to implement the parameters and any associated instructions transmitted by the network server to achieve optimal network performance. For example, the device may be arranged to carry out a handoff in accordance with a handoff parameter received from the server in order to provide uninterrupted and undiminished service as the user travels along the predicted route. As another example, the device may be configured to perform a data download at a specified location along the predicted route based on the network server's determination that the location offers high-speed, low-interference service. The mobile device also may be arranged to continually update its real-time location and predicted location based on the network's determination of the optimal update frequency. Each of the transmitted parameters may serve individually and collectively to improve the user's wireless communication capabilities and provide valuable location-based services based on accurately predicting the user's future location and travel route.

Figure 6:
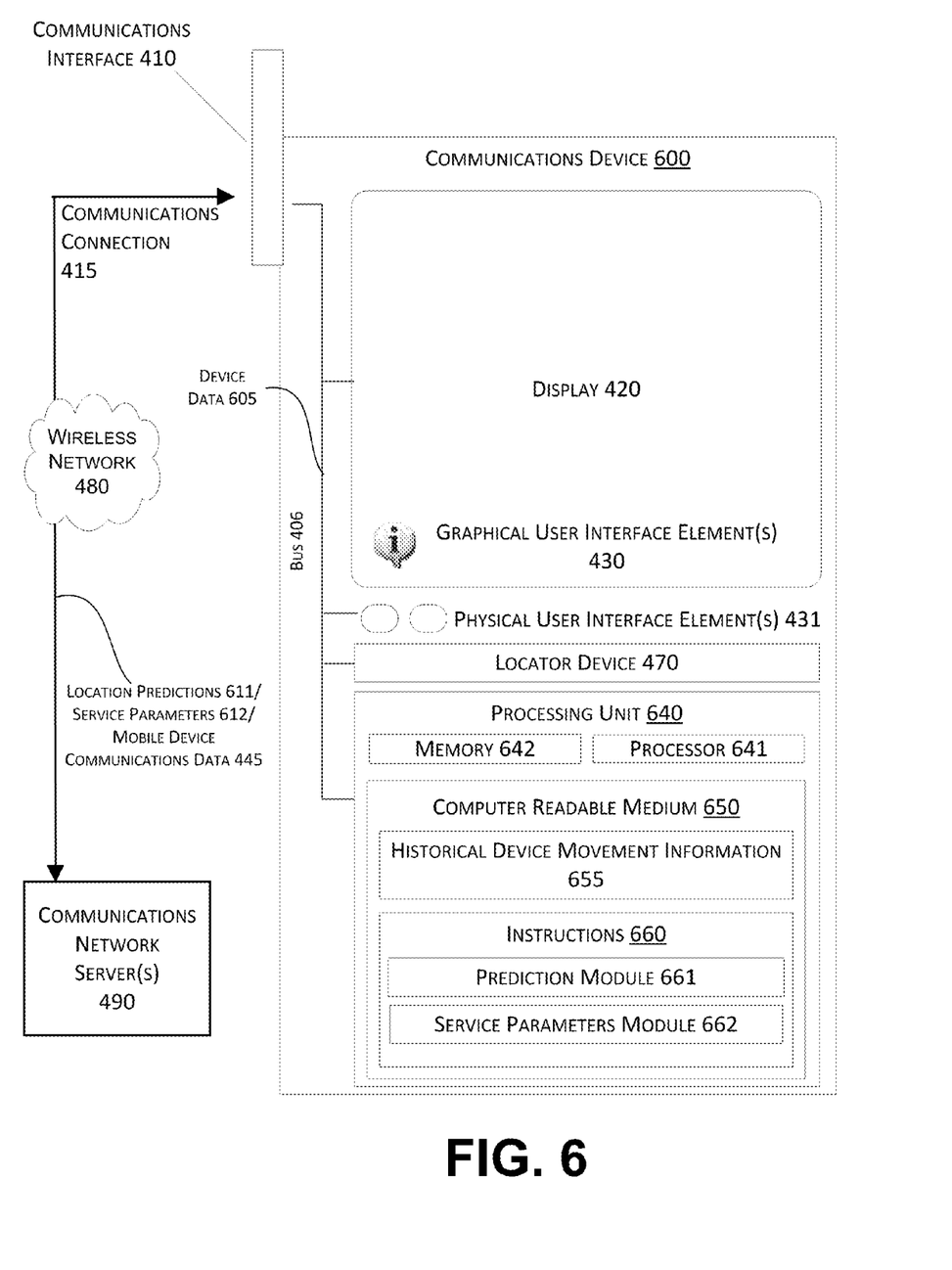
FIG. 6 is a diagram illustrating an example communications device such as device 110 in FIG. 1; all arranged in accordance with the present disclosure.

FIG. 6 is a diagram illustrating an example communications device 600 such as device 110 in FIG. 1 in accordance with the present disclosure. Device 600 may comprise a communications interface 410, a display 420, graphical user interface element(s) 430, physical user interface element(s) 431, a locator device 470, and a processing unit 640. The processing unit 640 may comprise a processor 641, memory 642, and a computer readable medium 650. The computer readable medium 650 may comprise historical device movement information 655 and instructions 660. The instructions 660 may comprise a prediction model 661 and a service parameters module 662.

In FIG. 6, communications device 600 may be coupled with communications network server(s) 490 via communications connection 415, over which location predictions 611/service parameters 612/mobile device communications data 645 may be transmitted by way of the wireless network 480. In addition, the communications device's communication interface 410, display 420, physical user interface elements 431, locator device 470, and computer-readable medium 650 may be operatively coupled together via bus 406, over which device data 605 may be transmitted.

FIG. 6 comprises many of the elements similar to FIG. 4, and like elements are given like identifiers. FIG. 6 contemplates a device configured to store historical device movement information 655 on a computer-readable medium 650 and to generate location prediction information and service parameters. As in FIG. 4, communications device 600 may comprise a mobile communications device such as a mobile phone or laptop computer and may contain many of the same elements as the computing device shown in FIG. 2.

Prediction module 661 may be arranged to aggregate and store device movement data 655 generated by a GPS unit or other locator device apparatus 470 on the device 600, and may be arranged to use such data to predict future device movements. The aggregated historical information 655 may be stored on a computer readable medium 650 on the device 600 in order to protect the privacy of the device user, rather than being shared with a network server. After generating location prediction data from the aggregated historical data, device 600 may be configured to transmit limited location prediction information 611 as needed to the network server 490 via a wireless network 480, to be used in determining service parameters, so as to minimize disclosure of private data about the user's regular travel patterns.

Service parameters module 662 may be used when the device has the capacity to use stored historical movement information and predicted future location information to optimize its own service, by establishing service parameters 612 such as handoffs, data rate, opportunistic scheduling, etc., rather than relying on the network server to establish such parameters. Alternatively, the device may be arranged to calculate its own service parameters 612 based on its predicted location and then transmit those parameters to the network server 490 via a wireless network 480, so that the server 490 may calculate and implement the service parameters 612.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various embodiments have been disclosed herein, other aspects and embodiments will be apparent to those skilled in art.

The invention claimed is:

1. A method for a network server to provide wireless communications service to a mobile device, comprising:
    establishing a location information link between a network server adapted to provide a wireless communication service and the mobile device;
    receiving real-time mobile device location information for the mobile device via the location information link;
    receiving, via the information link, vehicle navigation data acquired from a vehicle navigation device external to the mobile device, the vehicle navigation data comprising user-entered destination data;
    generating mobile device location prediction information using the real-time mobile device location information, the vehicle navigation data comprising the user-entered destination data, and mobile device velocity information;
    determining predicted interference environment information for available transmission channels at a predicted location corresponding to the mobile device location prediction information, wherein said determining predicted interference environment information uses one or more most recent measurements of interference at the predicted location, wherein the most recent measurements of interference are made using transmissions of one or more mobile devices other than the mobile device;
    identifying one or more transmission channels with a least amount of interference among the available transmission channels at the predicted location; and
    setting a transmission channel parameter for the mobile device, the transmission channel parameter specifying use of a transmission channel among the one or more transmission channels with a least amount of interference.

2. The method of claim 1, wherein the real-time mobile device location information comprises Global Positioning System (GPS) location information.

3. The method of claim 1, wherein the network server generates the mobile device location prediction information using one or more of previous mobile device location information, commuter information, and/or time of day information.

4. The method of claim 1, further comprising setting a wireless communications service parameter based at least in part on the location prediction information, wherein the wireless communications service parameter comprises one or more of a handoff parameter, a data rate parameter, a transmission mode parameter, an opportunistic scheduling parameter, a location-based service parameter, and/or a location update rate parameter.

5. The method of claim 1, wherein the real-time mobile device location information corresponds to a location of a Global Positioning System (GPS) unit that is integrated with the mobile device.

6. The method of claim 1, further comprising generating mobile device location prediction information relating to a plurality of mobile devices, and using the mobile device location prediction information relating to the plurality of mobile devices to set one or more wireless communications service parameters for one or more of the plurality of mobile devices.

7. The method of claim 1, further comprising:
    calculating a mobile device location update rate using the mobile device velocity information, wherein the location update rate increases with the velocity; and
    requesting real-time mobile device location updates from the mobile device at the mobile device location update rate;
    wherein the generating mobile device location prediction information uses real-time mobile device location information received at the mobile device location update rate.

8. The method of claim 1, wherein the vehicle navigation data acquired from the vehicle navigation device is acquired from the vehicle navigation device by the mobile device and wherein the network server receives the vehicle navigation data from the mobile device.

9. The method of claim 1, further comprising:
    calculating a wireless communications service parameter update rate using the mobile device velocity information, wherein the service parameter update rate increases with the velocity; and
    providing service parameter updates to the mobile device at the calculated service parameter update rate.

10. The method of claim 1, wherein the mobile device location prediction information comprises one or more predicted locations along a predicted travel route.

11. A method for a network server to provide wireless communications service to a mobile device in a vehicle, the method comprising:
    establishing a location information link between a network server adapted to provide a wireless communication service and the mobile device;

receiving real-time Global Positioning System (GPS) location information and vehicle navigation data for the mobile device via the location information link, the vehicle navigation data comprising user-entered destination data that corresponds to real-time location and navigation of the vehicle to the destination, wherein the mobile device has a communication link with a vehicle navigation device in the vehicle, and wherein the vehicle navigation device is external to the mobile device;

generating mobile device location prediction information using the real-time GPS location information, the vehicle navigation data comprising the user-entered destination data, and mobile device velocity information;

determining predicted interference environment information for available transmission channels at a predicted location corresponding to the mobile device location prediction information, wherein said determining predicted interference environment information uses one or more most recent measurements of interference at the predicted location, wherein the most recent measurements of interference are made using transmissions of one or more mobile devices other than the mobile device;

identifying one or more transmission channels with a least amount of interference among the available transmission channels at the predicted location; and setting a transmission channel parameter for the mobile device, the transmission channel parameter specifying use of a transmission channel among the one or more transmission channels with a least amount of interference.

12. The method of claim 11, further comprising setting a mobile device wireless communications service parameter based at least in part on the location prediction information, wherein the mobile device wireless communications service parameter comprises a handoff parameter.

13. The method of claim 11, further comprising setting a mobile device wireless communications service parameter based at least in part on the location prediction information, wherein the mobile device wireless communications service parameter comprises a data rate parameter.

14. The method of claim 11, further comprising:
calculating a mobile device location update rate using the mobile device velocity information, wherein the mobile device location update rate increases with the velocity;
requesting real-time GPS location updates at the mobile device location update rate;
wherein the generating mobile device location prediction information uses real-time GPS location information received at the mobile device location update rate.

15. The method of claim 11, wherein the mobile device location prediction information comprises one or more predicted locations along a predicted travel route.

16. A mobile device equipped to optimize wireless communications service to the mobile device based on predicted mobile device locations, comprising:

a processor; and
a computer readable medium comprising instructions executable by the processor, wherein the instructions are arranged to configure the processor to:
establish a communication link between the mobile device and a vehicle navigation device external to the mobile device, for communication of vehicle navigation data comprising user-entered destination data to the mobile device;
establish a Global Positioning System (GPS) location information link between the mobile device and a wireless communications service for communication of the vehicle navigation data comprising user-entered destination data acquired from the vehicle navigation device and real-time mobile device GPS location information to the wireless communications service;
receive a wireless communications service transmission channel parameter for the mobile device, wherein the transmission channel parameter is determined using predicted interference environment information for available transmission channels at a predicted location generated using the vehicle navigation data comprising user-entered destination data acquired from the vehicle navigation device and the real-time mobile device location information, and wherein the transmission channel parameter identifies one or more transmission channels with a least amount of interference among available transmission channels at the predicted location; and
implement the transmission channel parameter by the mobile device by using a transmission channel from among the one or more transmission channels with a least amount of interference at the predicted location.

17. The mobile device of claim 16, wherein the instructions are further arranged to configure the processor to generate the mobile device location prediction information by the mobile device.

18. The mobile device of claim 16, wherein the instructions are further arranged to configure the processor to carry out a handoff in accordance with a handoff parameter received from the wireless communications service.

19. The mobile device of claim 16, wherein the instructions are further arranged to configure the processor to throttle a data download in accordance with a data rate parameter received from the wireless communications service.

20. The mobile device of claim 16, wherein the instructions are arranged to configure the processor to:
receive a mobile device location update rate parameter; and
update real-time GPS location of the mobile device, via the GPS information link, according to the received mobile device location update rate parameter.

21. The method of claim 16, wherein the predicted location comprises a location along a predicted travel route.

* * * * *

UNITED STATES PATENT AND TRADEMARK OFFICE
CERTIFICATE OF CORRECTION

PATENT NO. : 8,706,131 B2  
APPLICATION NO. : 12/487054  
DATED : April 22, 2014  
INVENTOR(S) : Winters It is certified that error appears in the above-identified patent and that said Letters Patent is hereby corrected as shown below:

In the Specification

Column 3, Line 1, delete "detection" and insert -- prediction --, therefor.

Column 17, Line 52, delete "and or" and insert -- and/or --, therefor.

In the Claims

Column 22, Line 54, in Claim 21, delete "method of" and insert -- mobile device of --, therefor.

Signed and Sealed this  
Second Day of December, 2014

Michelle K. Lee  
*Deputy Director of the United States Patent and Trademark Office*